United States Patent
Schmidt

(10) Patent No.: US 7,707,176 B2
(45) Date of Patent: Apr. 27, 2010

(54) CONTENT MANAGEMENT SYSTEM WITH IMPROVED PERFORMANCE

(75) Inventor: Olaf Schmidt, Walldorf (DE)

(73) Assignee: SAP AG, Walldorf (DE)

( * ) Notice: Subject to any disclaimer, the term of this patent is extended or adjusted under 35 U.S.C. 154(b) by 306 days.

(21) Appl. No.: 11/644,746

(22) Filed: Dec. 22, 2006

(65) Prior Publication Data

US 2008/0154977 A1 Jun. 26, 2008

(51) Int. Cl.
*G06F 17/00* (2006.01)
(52) U.S. Cl. .................. 707/610; 707/613; 711/154
(58) Field of Classification Search .......... 707/1, 707/200, 2, 10; 711/154, 163
See application file for complete search history.

(56) References Cited

U.S. PATENT DOCUMENTS

| | | | | |
|---|---|---|---|---|
| 4,500,954 A | * | 2/1985 | Duke et al. | 711/138 |
| 5,091,846 A | * | 2/1992 | Sachs et al. | 711/130 |
| 6,157,991 A | * | 12/2000 | Arnon | 711/161 |
| 2003/0018638 A1 | * | 1/2003 | Abe et al. | 707/6 |
| 2005/0071336 A1 | * | 3/2005 | Najork et al. | 707/8 |
| 2006/0069821 A1 | * | 3/2006 | P et al. | 710/52 |
| 2006/0124754 A1 | * | 6/2006 | Takeda | 235/492 |
| 2006/0155774 A1 | * | 7/2006 | Sachedina et al. | 707/200 |
| 2008/0034174 A1 | * | 2/2008 | Traister et al. | 711/159 |
| 2008/0195722 A1 | * | 8/2008 | Jacobs et al. | 709/217 |

* cited by examiner

*Primary Examiner*—Don Wong
*Assistant Examiner*—Angela M Lie
(74) *Attorney, Agent, or Firm*—Fish & Richardson P.C.

(57) ABSTRACT

There is provided a system and method for improving the performance of a content management system. More specifically, in one embodiment, there is provided a computer readable medium having instructions operable to receive a request to perform a record management function on a record stored on a persistent storage medium in a content management system, communicate changes associated with the record management function to a buffer communicably coupled to the persistent storage medium, and move the buffered changes to the persistent storage medium such that the record is updated.

21 Claims, 6 Drawing Sheets

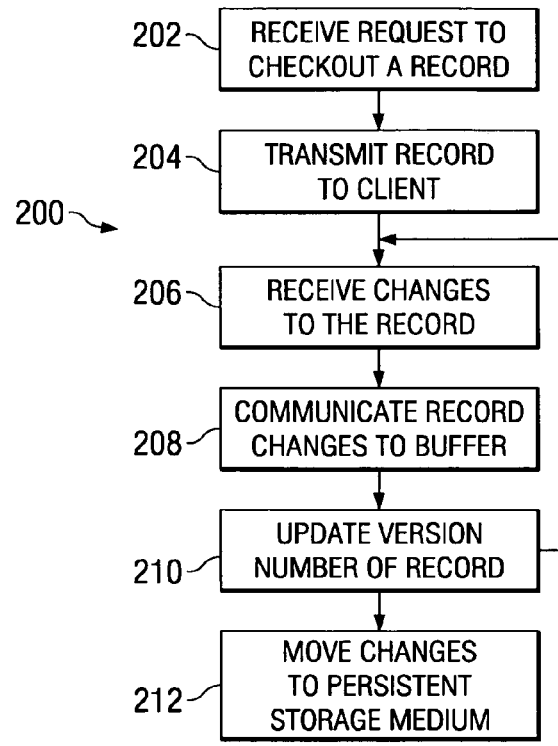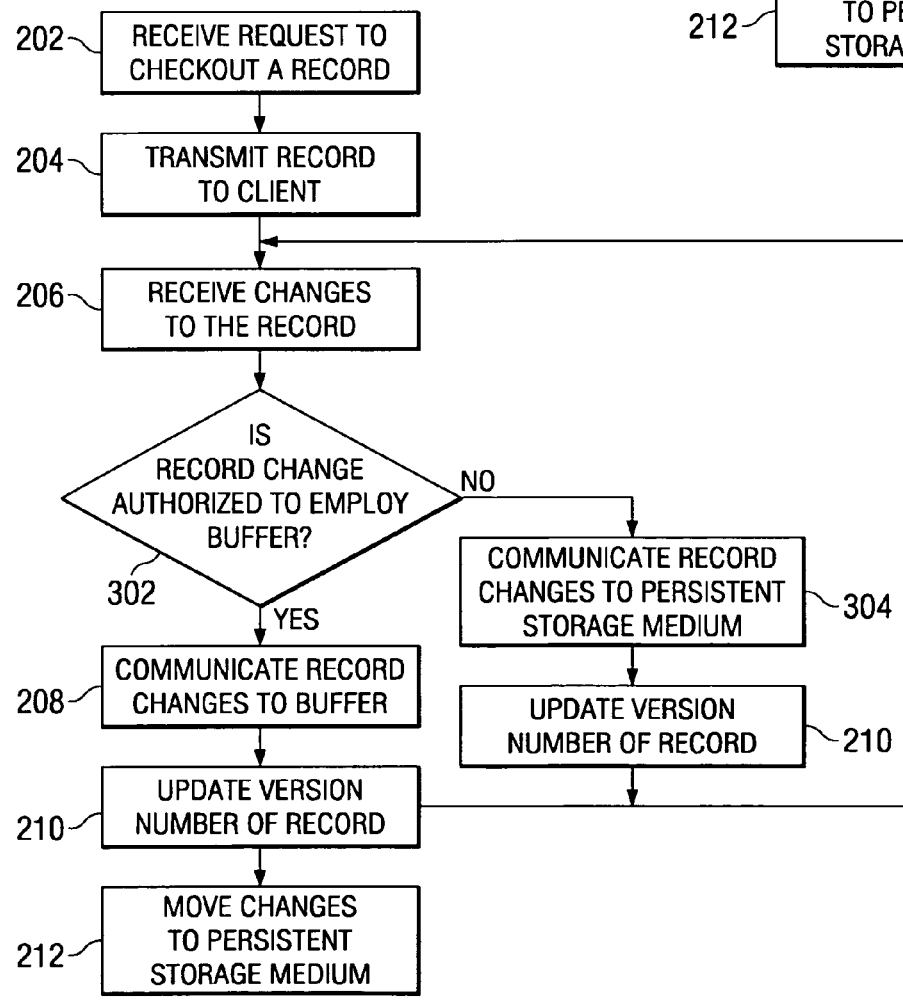

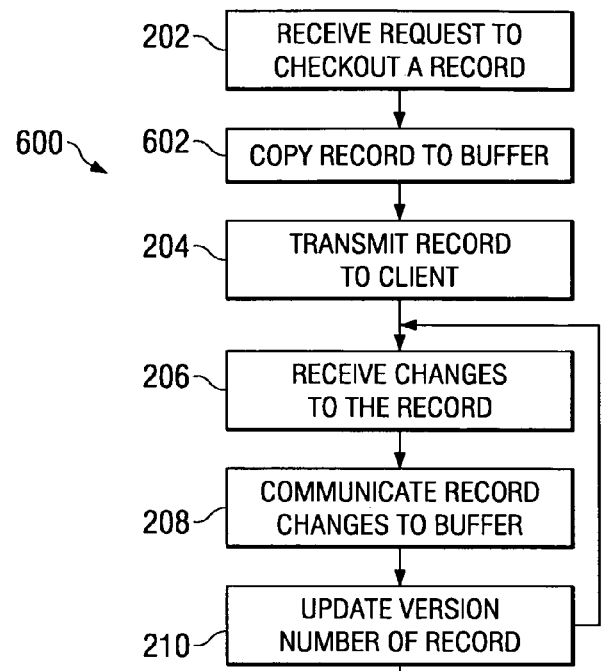
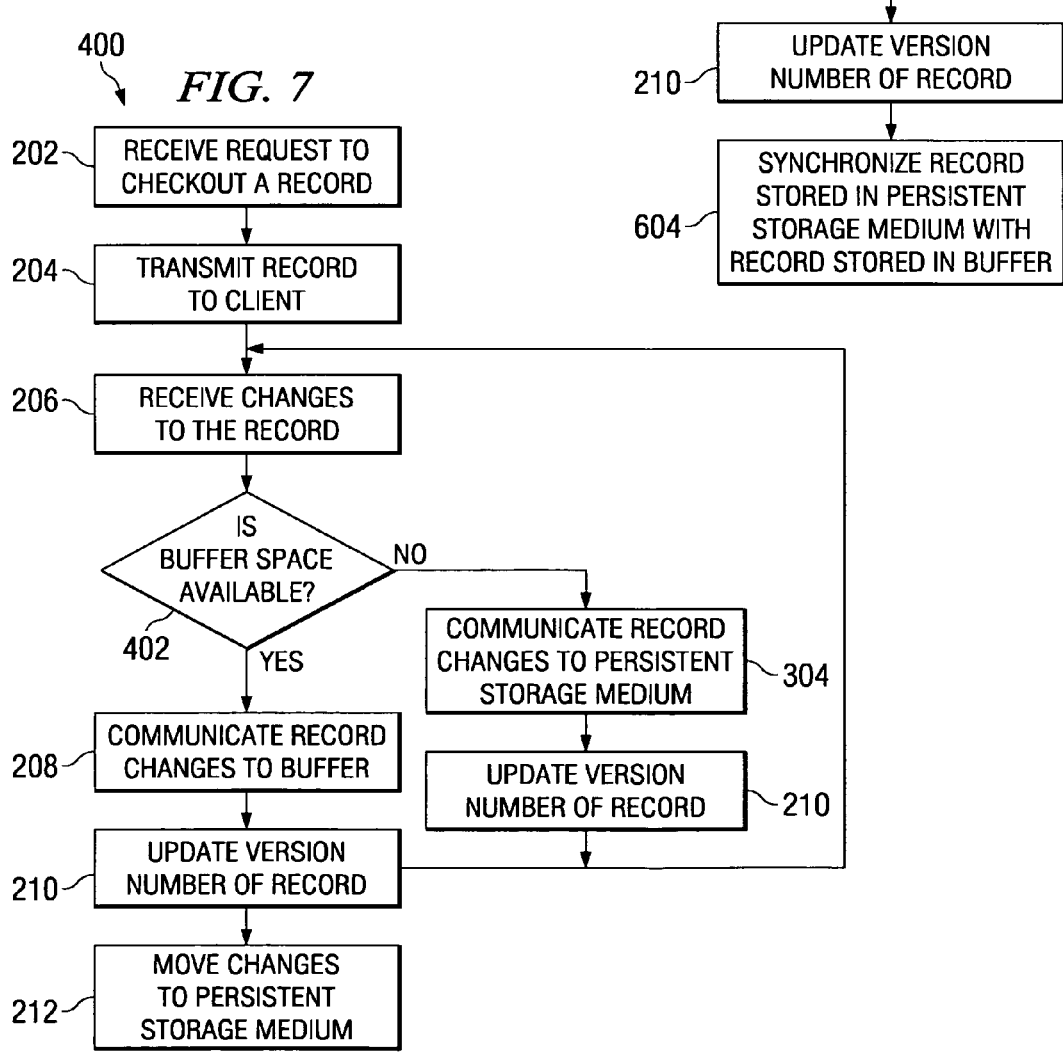

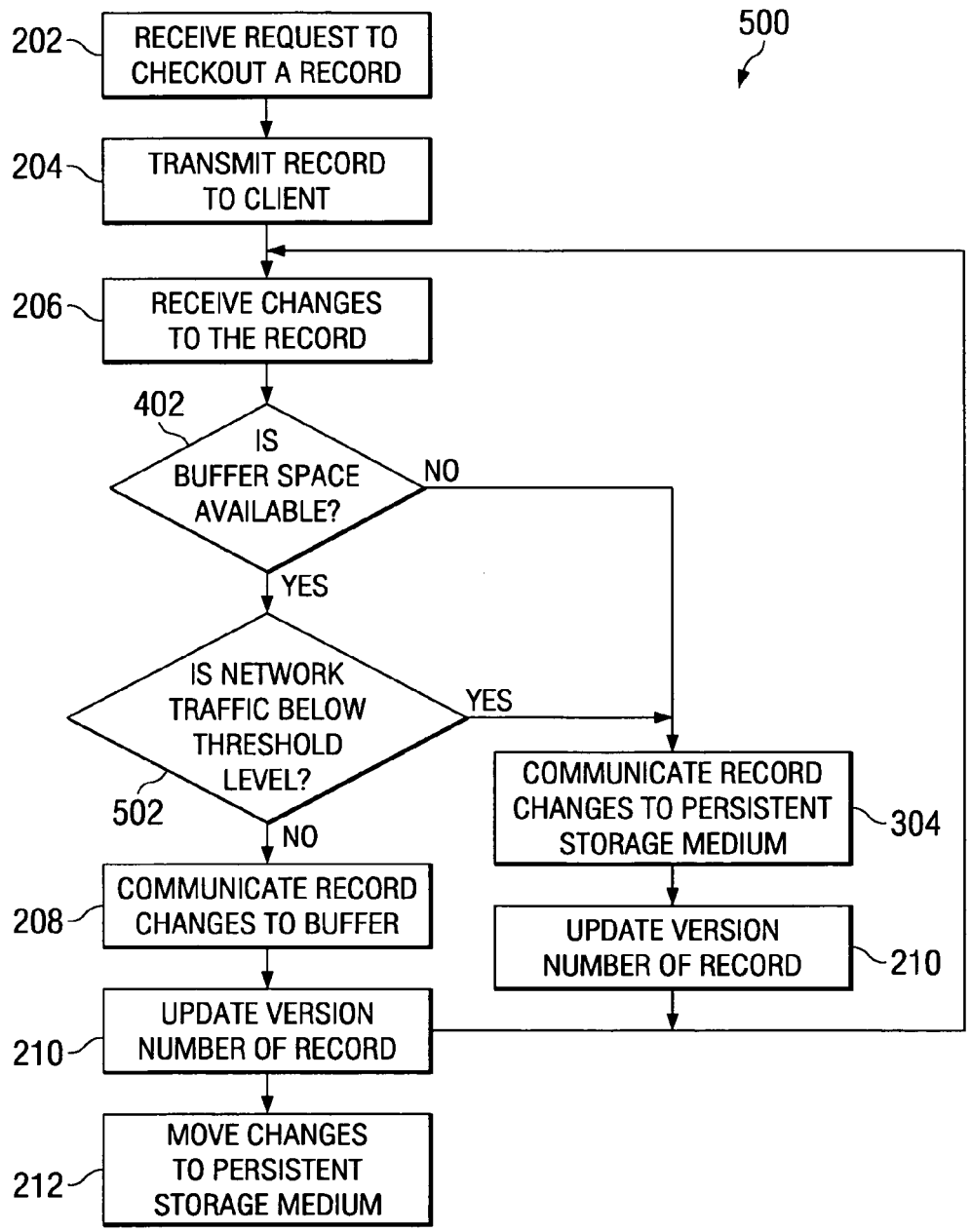

CONTENT MANAGEMENT SYSTEM WITH IMPROVED PERFORMANCE

TECHNICAL FIELD

This disclosure relates to content management systems and, more particularly, to content management systems that utilize one or more buffers to increase performance.

BACKGROUND

Content management systems are employed in a wide variety of industries to manage content in the form of records. Records may include, among other things, electronic documents, files, meta-data, employee or customer databases entries, and so forth. Capturing, managing, accessing, validating, archiving, and disposing of the information held in documents and records is a complex matter and a key challenge for organizations. Regulation, compliance, and legal requirements only add to the complexity. Archiving of some information is prescribed by law, such as the Data Protection, Freedom of Information Acts, Sarbanes-Oxley, and so forth. Electronic evidence is now readily acceptable by the courts, which require proof of the source and absence of tampering. Authentication or validation processes are essential. Accordingly, organizations may utilize a content management system.

Typically, content management systems are designed to support a large number of simultaneous users. In many conventional content management systems, users download or "check out" records from a persistent storage medium such as a hard drive or bank of hard drives. When changes are made to a particular record by one user (often via an application), the changes are copied back to the persistent storage medium at some point. While this copying is taking place, the user's interface to the content management system may freeze or suffer from relatively serious lag. As content management systems have become more complex and record sizes larger, the delays caused by these freezes have become longer such that, in some circumstances, users become frustrated by the delays and prematurely exit the content management system.

SUMMARY

There is provided a system and method for improving the performance of a content management system. Generally, this disclosure provides document/content management techniques on persistent storages that can be performed in an additional layer on top of the particular persistency layer that resides in main memory (or other disk) such that it may provide accelerated document management, content management functionalities. More specifically, in one embodiment, there is provided a computer readable medium having instructions operable to receive a request to perform a record management function on a record stored on a persistent storage medium in a content management system, communicate changes associated with the record management function to a buffer communicably coupled to the persistent storage medium, and move the buffered changes to the persistent storage medium such that the record is updated.

In another embodiment, there is provided a content management system having a persistent storage medium configured to store one or more records and a buffer coupled to the persistent storage medium. In this embodiment, the content management system is configured to receive a request to perform a record management function on a record stored on the persistent storage medium, save changes associated with the record management function in the buffer, and asynchronously copy the saved changes to the persistent storage medium.

The foregoing example instructions—as well as other disclosed techniques—may also be computer implementable methods. Moreover, some or all of these aspects may be further included in respective systems or other devices for executing, implementing, or otherwise supporting a content management system with increased response time. The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIG. 5 illustrates an example technique for decreasing the response time of the content management system of FIG. 1 in accordance with certain embodiments included in the present disclosure;

FIG. 6 illustrates another example technique for decreasing the response time of the content management system of FIG. 1 in accordance with certain embodiments included in the present disclosure;

FIG. 7 illustrates a third example technique for decreasing the response time of the content management system of FIG. 1 in accordance with certain embodiments included in the present disclosure;

FIG. 8 illustrates a fourth example technique for decreasing the response time of the content management system of FIG. 2 in accordance with certain embodiments included in the present disclosure; and FIG. 9 illustrates a fifth example technique for decreasing the response time of the content management system of FIG. 2 in accordance with certain embodiments included in the present disclosure.

DETAILED DESCRIPTION

Figure 1:
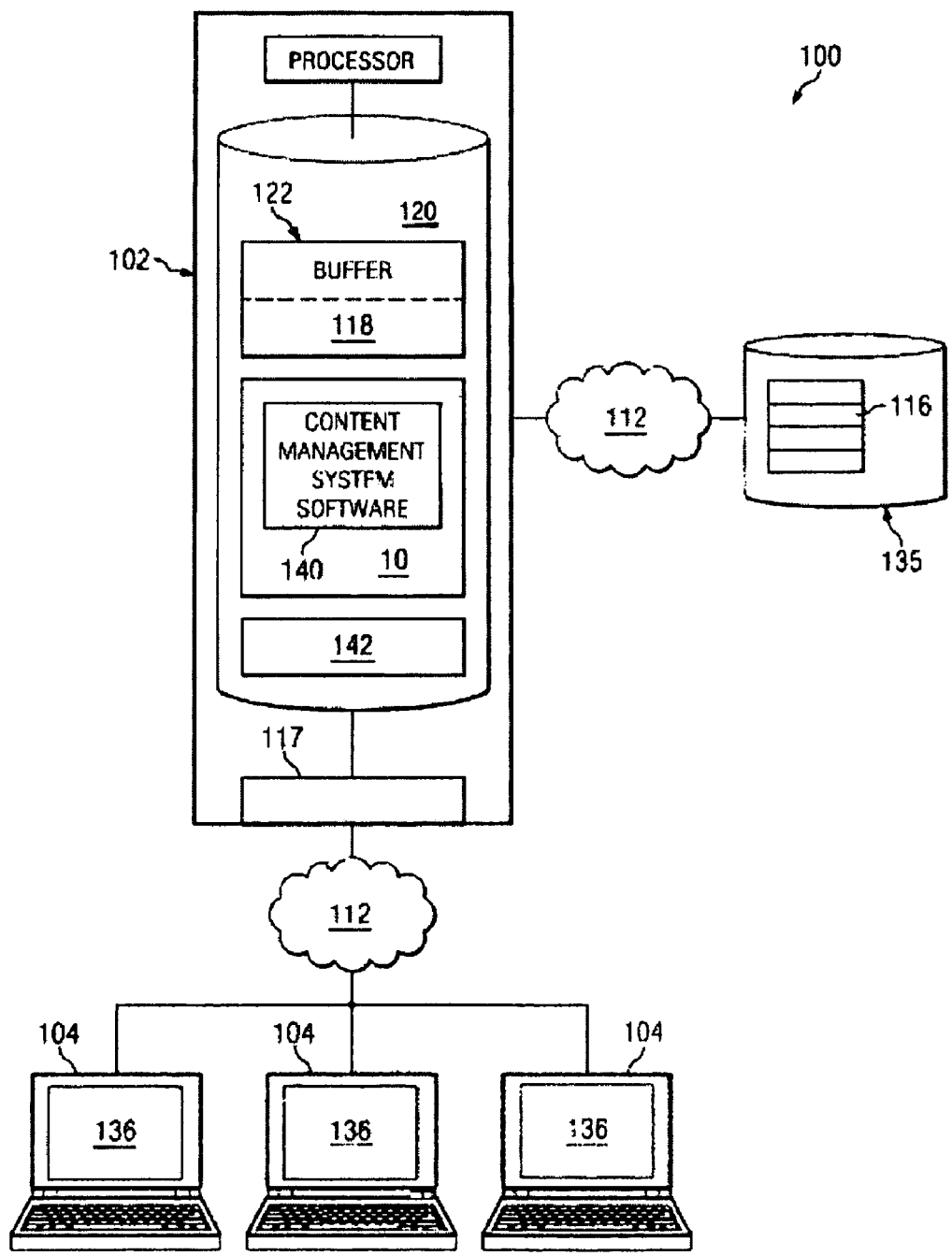
FIG. 1 illustrates an example content management system, in accordance with certain embodiments included in the present disclosure.

The disclosure provides systems and methods for improving the performance of a content management system 100. Conventional buffering or caching solutions only support read access to records (e.g., documents, meta-information, and the like). As such, in certain systems, any cached records are invalidated as soon as the record is modified. Thus, the next access to the modified record induces a reload of the record from the persistent storage medium, such as a data repository, to the requesting client computer. Generally, content management system 100 is configured to buffer record changes in memory and then asynchronously persist them to the persistent storage medium, such as local drives or a remote repository. In many cases, a communicably-coupled client computer can be updated from the memory without a relatively slow read access to the persistent storage medium. This often results in an overall improved performance by providing, for example, better hit ratio, faster response times, and so forth. For example, FIG. 1 illustrates one example of content management system 100 configured to exhibit improved performance. In one implementation, the content management system 100 may be configured to receive a request to perform a record management function on a record stored on a persistent storage medium in the content management system, to communicate changes associated with the record management function to a buffer communicably coupled to the persistent storage medium, and to asynchronously move the buffered changes to the persistent storage medium such that the record is updated. It will be understood that described techniques and components can be used in any suitable situation or system where document management techniques (like versioning of documents) are utilized. Indeed, system 100 may provide locking mechanisms for content in order to provide correct version management. Accordingly, such content can be locked while it is updated by one user such that other users may be unable to modify the content but can still see the old version. As soon as the content is unlocked, a new version is created.

Figure 2:
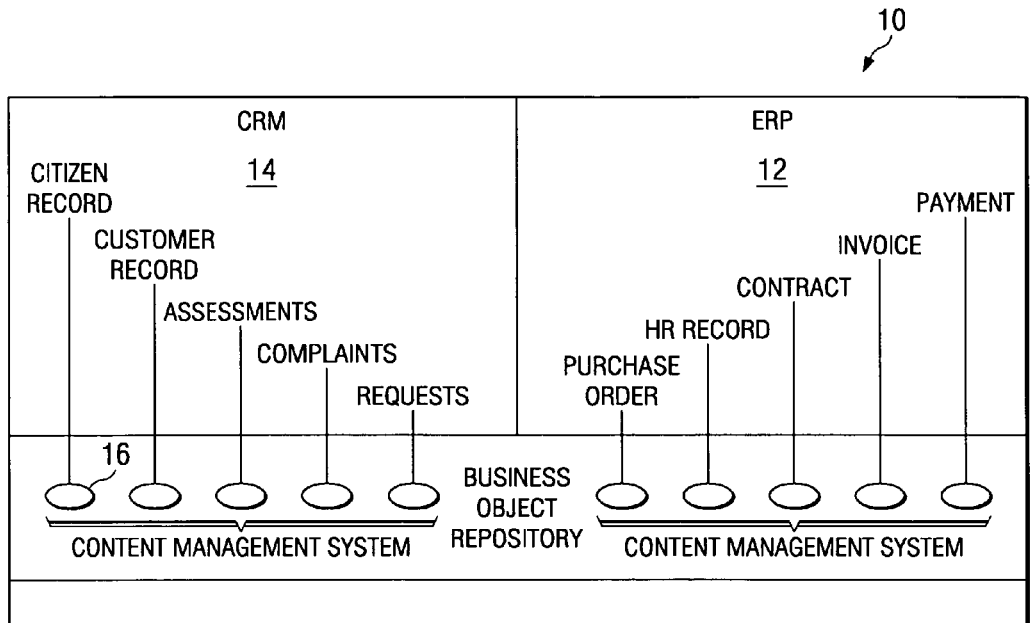
FIG. 2 illustrates an exemplary business workflow system including, implementing, or otherwise communicably coupled with one example of the content management system included in the present disclosure.

For example, content management system 100 may be utilized within or otherwise support business workflow system 10, shown in example FIG. 2. The business workflow system 10 may enable customers to achieve these ends by automating business processes and the flow of information based on individual roles and responsibilities. Specifically, often information or requests incoming to an organization prompt action, whether it be for information, approval, review, or otherwise. As such, the business workflow system 10 may allow customers to automate processes across departments, authorities, and other agencies, resulting in improved efficiency and transparency, while maintaining a complete audit trail with version control to ensure compliance with legal and regulatory requirements. For example, the illustrated business workflow system may be employed with existing enterprise resource planning ("ERP") module 12 and customer relationship management ("CRM") module 14. As will be discussed further below, the ERP system 12 and the CRM system 14 may be coupled to the content management system 100 via one or more business objects stored in a business object repository 16. Alternatively, the business workflow system 10 may be employed independent of the ERP 12 or the CRM 14. Of course, business workflow system 10 may represent a distributed or hosted solution that is partially or fully provided or managed by one or more vendors or other third parties. For example, the respective ERP module may be licensed from a first third party and the CRM module may be remotely accessed via a solution hosted by a second third party.

Turning to illustrated FIG. 1, the example content management system 100 may be a distributed client/server system that spans one or more networks, such as network 112. In these types of implementations, data may be communicated or stored in an encrypted format using any standard or proprietary encryption algorithm. In still other implementations, the system 100 may be in a dedicated enterprise environment—across a local area network or subnet—or any other suitable environment without departing from the scope of this disclosure. The system 100 may include or be communicably coupled with a server 102, one or more clients 104, and the network 112. It will be appreciated, however, that FIG. 1 provides merely one example of computers that may employ or execute the techniques described herein.

Figure 3:
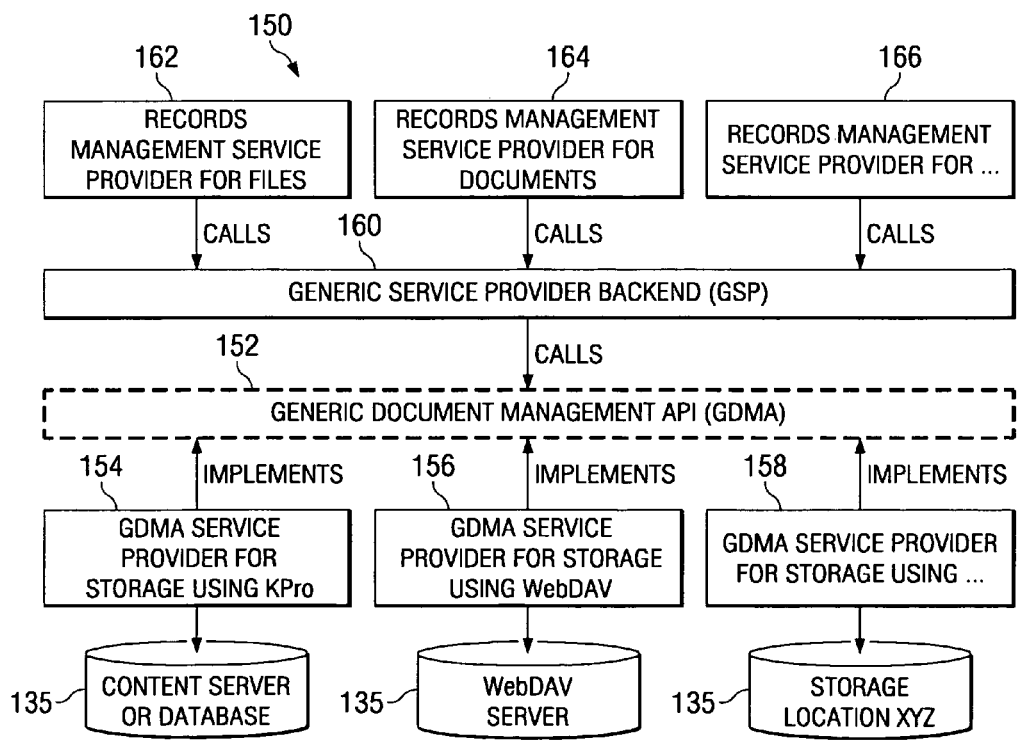
FIG. 3 illustrates an architectural view of one example implementation of the content management system 100 of FIG. 1.

The server 102 may be an electronic computing device operable to receive, transmit, process, and store data associated with the system 100. For example, FIG. 3 illustrates an architectural view 150 of one embodiment of the server 102 of FIG. 2, in accordance with certain embodiments included in the present disclosure. The architecture 150 enables records to be stored in one or more different repositories 135, as will be described in detail below. To the user, however, these different repositories are typically not overtly visible with the user interface remaining the same for each of them.

The central part of architecture 150 is a generic document management API ("GDMA") 152. The GDMA 152 is defined through a set of interfaces, which are implemented by GDMA service providers 154, 156, and 158. The GDMA service providers 154, 156, and 158 define which of the repository's 135 particular records are to be stored. For example, in customizing or registry maintenance operations, a user can configure for each type of records which of these GDMA service providers 154, 156, and 158 (i.e., which repository or storage location 135) is selected. As illustrated, in one embodiment, there are three GDMA service providers: the service provider 154 for storage using the knowledge provider ("KPRO"), the service provider 156 using another application, and a generic service provider 158.

The GDMA 152 may be called by the generic service provider backend ("GSP") 160. In turn, the GSP Backend 160 offers an API that is called by the record management service providers 162, 164, and 166. The record management service providers 162, 164, and 166 are responsible for displaying an element within records management. Because the architecture 150 is conceived openly, users can implement separate records management service providers 162, 164, and 166 and GDMA service providers 154, 156, and 158.

The GSP 160 may be employed to implement one or more records management services, which are also referred to as "record management functions." In other words, the GSP 160 (and hence the server 102 upon which the GSP 160 is running) may be configured to perform record management functions of the record management service providers 162, 164, 166 on the records stored in the repositories 135. In one embodiment, the GSP 160 is configured to implement the record management functions by executing one or more business objects or interfaces, which may be stored in the business object repository 16 (see FIG. 1).

Figure 4:
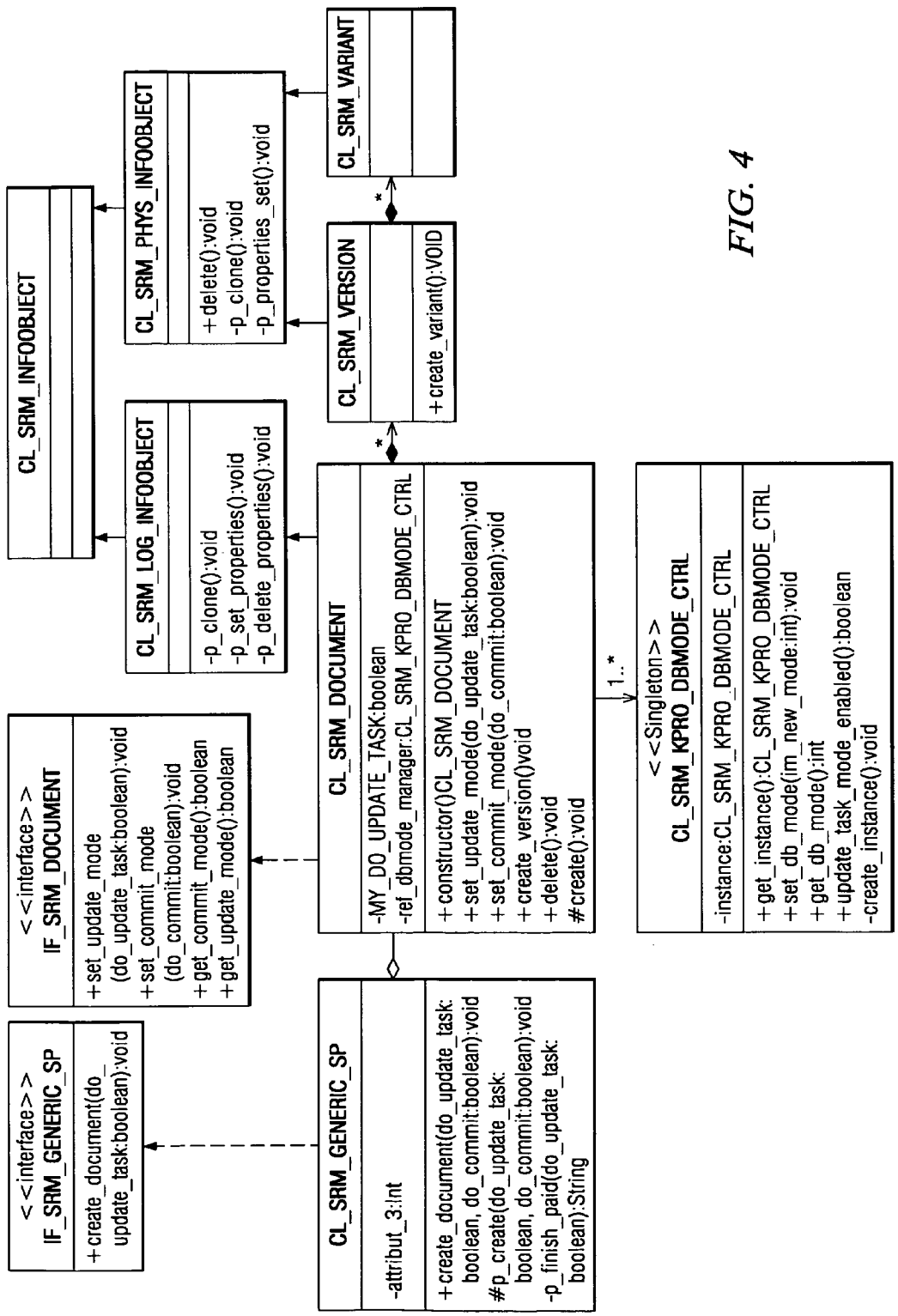
FIG. 4 illustrates a plurality of business objects that may be employed, either alone or in combination, to perform the record management function, in accordance with certain embodiments included in the present disclosure.

For example, FIG. 4 illustrates a plurality of business objects that may be employed, either alone or in combination, to perform the record management function, in accordance with certain embodiments included in the present disclosure. It will be appreciated, however, that the business objects illustrated in FIG. 4 are representative and not exclusive. As such, in other embodiments, other suitable business objects, interfaces, or methods may be employed. However, for the purpose of providing an example of their functionality, the "IF_SRM_GENERIC_SP" business object is configured, when executed, to provide a general connection to the repository 135. For example, this business object may be configured to execute methods that create documents, retrieve documents from the repository 135, retrieve record attributes, and so forth.

Returning to FIG. 1, it will be appreciated that though FIG. 1 illustrates a single server 102, the system 100 can also be implemented using computers other than servers, as well as a server pool. Indeed, the server 102 may be any computer or processing device, such as, for example, a blade server, general-purpose personal computer ("PC"), Macintosh, workstation, Unix-based computer, or any other suitable device. Moreover, the server 102 may also be computers other than general purpose computers, as well as computers without conventional operating systems. The server 102 may be adapted to execute any suitable operating system including Linux, UNIX, Windows Server, and so forth. Further, in some embodiments (not shown), the server 102 may also include or be communicably coupled to a web server and/or a mail server.

The server 102 may be communicably coupled to the repository 135. As mentioned above, the repository 135 may include one or more persistent storage devices (hard drives, etc) that form a storage backbone for the content management system 100. In one embodiment, the repository 135 includes a plurality of hard disk drives that are coupled, either internally or externally, to the server 102 via a direct connection, such as an integrated drive electronics ("IDE") connection, a small computer systems interface ("SCSI") connection, a Serial ATA ("SATA") connection, or other suitable communicable connection.

In another embodiment, the repository 135 is coupled to the server 102 over a portion of network 112. In such an embodiment, the repository 135 may include any suitable intra-enterprise, inter-enterprise, regional, nationwide, or substantially national electronic storage facility, data processing center, or archive that allows for one or a plurality of registration processors to dynamically store records 116, which may include any data related to, used, created, stored by, or otherwise associated with an application or database. For example, the records 116 may include purchase order numbers, invoice numbers or identifiers, invoice names, order status identifiers, product descriptions, product names or identifiers, vendor product numbers or identifiers, product categories, vendor names or identifiers, requesting party names or identifiers, product recipient names or identifiers, delivery locations, account numbers, account assignment categories, account assignment values, invoice recipient names or identifiers, invoicing parties, gross invoice values, gross invoice amounts, and invoice dates. The records 116 can often store documents, or any version or variant thereof. Variants may be considered special types of versions. Variants of a document can be a translation (language variant) or another format version of the same content. In other words, variants normally represent the same development state of the document and, in essence, the same semantic. The variant that is accessed may depend on your language setting and other settings.

In some embodiments, the records 116 (or pointers thereto) may be stored in one or more tables in a relational database described in terms of SQL statements or scripts. In another embodiment, the records 116 may be formatted, stored, or defined as various data structures in text files, extensible Markup Language (XML) documents, Virtual Storage Access Method (VSAM) files, flat files, Btrieve files, comma-separated-value (CSV) files, internal variables, or one or more libraries. In short, the records 116 may stored in one table or file or a plurality of tables or files stored on one computer or across a plurality of computers in any appropriate format. Indeed, some or all of the records 116 may be local or remote without departing from the scope of this disclosure and store any type of appropriate data. Moreover, the records 116 may be bundled and/or transmitted in a different format, than it was stored in. In short, the records 116 may be provided or otherwise stored in one or more repositories, such as the repository 135 or the memory 120 (described below). These repositories may be centrally located and may be associated with one or more business modules that may be unrelated. Although the repository 135 is illustrated in FIG. 1 as a single feature, the repository 135 may include two or more separate (logical or physical) repositories. For example, the repository 135 may include a repository for electronic documents, another repository for files, and so forth. In one embodiment, the repository 135 may be a central database communicably coupled with the server 102 and the clients 104 via a virtual private network ("VPN"), Secure Shell tunnel, or other secure network connection. As such, the repository 135 may be physically or logically located at any appropriate location so long as the repository 135 remains operable to store information and/or data associated with system 100 and communicate such information and/or data to the server 102 or at least a subset of plurality of clients 104.

The server 102 may also include the processor 125. The processor 125 executes instructions, such as the CMS software described further below, and manipulates data to perform the operations of the server 102. In various configurations, the processor 125 may be, for example, a central processing unit ("CPU"), a blade, an application specific integrated circuit ("ASIC"), a field-programmable gate array ("FPGA"), or other suitable logic device. Although FIG. 2 illustrates a single processor 125 in server 102, multiple processors 125 may be used according to particular needs and reference to processor 125 is meant to include multiple processors 125 where applicable.

The server 102 also includes local memory 120. The memory 120 may include any memory or storage module and may take the form of volatile or non-volatile memory including, without limitation, magnetic media, optical media, random access memory ("RAM"), read-only memory ("ROM"), removable media, or any other suitable local or remote memory component. The memory 120 may be internally or externally coupled to the sever 102 and may store any appropriate data including temporary instance of records 116 or a portion of the persisted records 116.

The illustrated memory 120 includes a buffer 122. As will be described in greater detail below, the buffer 122 may be configured to store copies of changes 118 to the records submitted by the clients 104. As such, the clients 104 may be able to make changes to the records 116 (via the record changes 118) without immediately accessing the repository 135. Rather, as will be described in further detail below, the server 102 may be configured to asynchronously move the record changes 118 from the buffer 122 to the repository 135 at an appropriate time.

In addition, the illustrated memory 120 may store or reference any appropriate data. For example, memory 120 may include instructions or data 142 for one or more applications, such as operational instructions, software, VPN applications or services, firewall policies, a security or access log, print or other reporting files, HTML files or templates, related or unrelated software applications or sub-systems, and others. Illustrated memory 120 further stores or references business workflow system 10 and content management system ("CMS") software 140.

The business workflow system 10 may enable users to map both predefined and ad-hoc process flows, such as may be desired. In particular, in one embodiment, the business workflow system 10 may integrate all areas of an organization, ranging from simple business processes to specific technical procedures running on different application systems. For example, a user may be able to provide a single point of access to all information, especially to records, for all authorized employees; enhance the efficiency and transparency of your business processes; integrate public and corporate services on the Internet directly into electronic records management; manage paper and electronic records in one system; integrate business objects, such as application documents, with their scanned images; and/or cut costs for storing paper records.

As illustrated in FIG. 2, the business workflow system 10 includes the content management system 100, which may be configured to deliver a structured approach to managing records (e.g., documents, files, etc.). Further, the content management system 100 may also maintain documentary evidence on the basis of the context in which it is captured to provide a clear audit trail of information associated with a business process, or subject matter. For example, paper documents can be digitized, entered into the system, stored, managed, and archived. Further, the system 100 can be searched easily and quickly from one point of access. Moreover, the content management system 100 can create or otherwise maintain contextual data, such as the date a document was received, who received it, what action was taken, a reference number for it, and so forth.

The content management system 100 also may allow a wide range of pertinent contextual information to be integrated with a record. The contextual information can be from local or third party applications, Internet pages, computer-aided design ("CAD") systems, geographical information systems ("GIS"), or any other suitable source. Further, equally contextual information from office communication tools, such as e-mail, faxes, contacts, or word processing and spreadsheet applications, can also be integrated with the record. As a result, the content management system 100 can provide a single view of related information and can use the contextual information for processing the document or record.

Moreover, as illustrated in FIG. 2, the content management system software 140 can be partially or fully integrated into business workflow systems and tools. For example, using a business workflow tool, a user can define all the steps and rules within a process and assign responsibilities for carrying out the tasks within the process. In addition, a workflow management tool may be configured to define the signatory powers of those individuals. At the same time, the content management system 100 may be configured to provide effective data security and protection, particularly in sensitive areas of information. In particular, the content management system 140 may deliver various levels of security through three crucial elements, such as authentication (ensuring that people accessing the system are who they say they are), authorization (restricting users to the tasks they are authorized to carry out based on their role), and integrity (ensuring tamper-proof data through digital signatures and keys). This security may include role-based, session-based, resource-based, as well as other types of verification and authentication.

The CMS application 140 may include instructions, code, programs, or other software stored in the memory 120 and configured to be executable by a processor 125. For example, in one configuration, the CMS application 140 may include computer readable instructions for receiving a request to perform a record management function on the record 116 stored in the repository, communicating the changes 118 associated with the record management function to the buffer 122, and asynchronously moving the buffered changes 118 to the repository 135 such that the record 116 is updated. In other embodiments, the CMS application 140 may be stored on any other suitable computer readable storage medium with the system 100. For example, the CMS software may be fully or partially stored in the repository 135.

As described above, in the illustrated embodiment, the processor 125 executes the CMS application 140 stored in the memory 120. But it will be understood that the CMS application 140 may be stored (and executed from) on any suitable computer readable medium including software, firmware, wired or programmed hardware, or any combination thereof as appropriate. Moreover, the CMS application 140 may be written or described in any appropriate computer language including C, C++, Java, Visual Basic, assembler, Perl, any suitable version of 4GL, as well as others. For example, portions of the CMS application 140 may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's NET. Further, while illustrated as internal to server 102, one or more processes associated with the CMS application 140 may be stored, referenced, or executed remotely. For example, a portion of CMS application 140 may be a web service that is remotely called, while another portion of CMS application 140 may be an interface object bundled for processing at remote client 104. Moreover, CMS application 140 may be a child or sub-module of another software module or enterprise application (such as business workflow system 10) without departing from the scope of this disclosure. Put simply, illustrated business workflow system 10 (or, more generally, business application 10) and content management system application 140 may be integrated or de-coupled as appropriate across businesses, departments, or system boundaries.

The server 102 may also include an interface 117 for communicating with other computer systems, such as the clients 104, over the network 112 in a client-server or other distributed environment. In certain embodiments, the server 102 receives data from internal or external senders through the interface 117 for storage in the memory 120 and/or processing by the processor 125. Generally, the interface 117 comprises logic encoded in software and/or hardware in a suitable combination and operable to communicate with the network 112. More specifically, the interface 117 may include software supporting one or more communications protocols associated with the network 112 or hardware operable to communicate physical signals.

The network 112 facilitates wireless or wireline communication between the server 102 and any other local or remote computer, such as the clients 104. The network 112 may be all or a portion of an enterprise or secured network. In another example, the network 112 may be a VPN between the server 102 and the clients 104 across wireline or wireless link. Such an example wireless link may be via I.E.E.E. 802.11a, 802.11b, 802.11g, 802.11n, 802.20, WiMax, and many others. While illustrated as a single or continuous network, network 112 may be logically divided into various sub-nets or virtual networks without departing from the scope of this disclosure, so long as at least a portion of network 112 may facilitate communications between server 102 and at least one of the clients 104. For example, the server 102 may be communicably coupled to the repository 135 through one sub-net while communicably coupled to a particular client 104 through another. In other words, the network 112 may encompass any internal or external network, networks, sub-network, or combination thereof operable to facilitate communications between various computing components in system 100.

The network 112 may communicate, for example, Internet Protocol ("IP") packets, Frame Relay frames, Asynchronous Transfer Mode ("ATM") cells, voice, video, data, and other suitable information between network addresses. Network 112 may include one or more local area networks ("LANs"), radio access networks ("RANs"), metropolitan area networks ("MANs"), wide area networks ("WANs"), all or a portion of the global computer network known as the Internet, and/or any other communication system or systems at one or more locations. In certain embodiments, the network 112 may be a secure network accessible to users or the clients 104.

The clients 104 may be any computing device operable to connect or communicate with the server 102 or the network 112 using a suitable communication link. For example, the clients 104 may include personal computers, touch screen terminals, workstations, network computers, kiosks, wireless data ports, smart phones, personal data assistants ("PDAs"), one or more processors within these or other devices, or any other suitable processing device. For example, the clients 104 may be part of the ERP system 12 or the CRM system 14. In a further example, the clients 104 may include a PDA operable to wirelessly connect with an external or unsecured network. In another example, the client 104 may be a laptop computer that includes an input device, such as a keypad, touch screen, mouse, or other device that can accept information, and an output device that conveys information associated with the operation of server 102. Moreover, it will be understood that although three clients 104 are illustrated in FIG. 1, the system 100 may employ any suitable number of clients. Further, it should also be understood that "client" and "user" may be used interchangeably as user actions often enter the system 100 via the client 104. Moreover, for ease of illustration, each client 104 is described in terms of being used by a single user. However, it will be appreciated that many users may use one client 104 or that one user may use multiple clients 104.

The clients 104 may include or execute a graphical user interface ("GUI") 136. The GUI 136 may be configured to allow the user of the client 104 to interface with at least a portion of system 100 for any suitable purpose, such as viewing applications or making changes to one or more of the records 116. For example, the GUI 136 may display a secure webpage that allows users to input data or to define search parameters to search the records 116. It should be understood that the term graphical user interface may be used in the singular or in the plural to describe one or more graphical user interfaces and each of the displays of a particular graphical user interface. Indeed, reference to the GUI 136 may indicate a reference to the front-end or a component of CMS application 140, as well as the particular interface accessible via client 104, as appropriate, without departing from the scope of this disclosure. Therefore, the GUI 136 contemplates any graphical user interface, such as a generic web browser or touch screen, that processes information in system 100 and efficiently presents the results to the user. The server 102 can accept data from one of the clients 104 via the web browser (e.g., Microsoft Internet Explorer or Netscape Navigator) and return the appropriate HTML or XML responses to the browser using network 112.

As described above, the content management system 100 may be configured to decrease its response time by communicating at least a portion of changes 118 associated with the particular record management function to the buffer 122 and then asynchronously moving the buffered changes 118 to the repository 135 such that the record 116 is updated. Regardless of the particular hardware or software architecture used, content management system 100 is generally capable of receiving a request to perform a record management function on a record stored on a persistent storage medium in a content management system, communicating changes associated with the record management function to a buffer communicably coupled to the persistent storage medium, and moving the buffered changes to the persistent storage medium such that the record is updated The following descriptions of flowcharts focus on the operation of the content management system 100 or one of its components or sub-modules, in performing one of the respective methods or processes. But the system 100 contemplates using any appropriate combination and arrangement of logical elements implementing some or all of the described functionality. Accordingly, FIG. 5 is a flow chart illustrating an exemplary technique 200 for decreasing the response time of a content management system in accordance with one embodiment. In one configuration, software operable to perform or that implement the technique 200 (as well as one or more of the other techniques described below) is stored on the memory 120 and then executed by the processor 125, as described above with regard to FIG. 2.

As indicated by step 202 of FIG. 5, the technique 200 may begin by receiving a request to check out a record. In one embodiment, receiving the request to check out a record may include receiving a structured or formalized request to check out the record 116 from the repository 135. In other embodiments, however, receiving a request to check out the record 116 may be a simple request by one of the clients 104 to access or download the record 116. In various embodiments, the record 116 may include electronic documents, files, metadata, database entries, and the like.

After receiving the request to check out the record 116, the technique 200 may involve transmitting the record 116 to the client 104. After receiving the record 116, the client 104 may perform one or more record management functions on the record 116. For example, suitable record management functions may include modifying the record content (e.g., editing an electronic document, creating a new document version), modifying record attributes or meta-information, checking the record back in, deleting record versions, locking or unlocking different record versions, as well as any other appropriate or suitable record management. With respect to versioning, one document can be divided into several parts. The first part is the working version—it is created after a document is created and the content is written the first time. CMS application 140 can provide direct access to this version. The interface object can be considered the master document. When client 104 accesses the particular document, it often receives the master document first. The client 104 can then use that to access other parts of the document as they become available. If repository 135 supports or utilizes versioning, the master document represents either the working version (if there is one and client 104 is the owner) or the most recently checked-in version of the document. Repository 135 may then decide if a non-owner of the working version sees the working version or only the most recently checked-in version. This may prevent others from viewing unreleased versions. In certain embodiments, other suitable record management functions may be performed by the client 104.

After the client 104 has initiated one or more record management functions, the server 102 may receive the record management function from the client 104 in the form of changes 118 to the record 116, as indicated by step 206. After receiving the record changes 118, which may also be referred to as the "record delta," the technique 200 may include communicating the record changes 118 to the buffer 122, as indicated by step 208. For example, as shown in FIG. 1, the record changes 118 may be stored in the memory 120. After the record changes 118 are communicated to the buffer, the version number of the record may be updated to indicate the performance of the record management function, as indicated by step 210.

After the version number of the record has been updated, the technique 200 may cycle back to step 206 to receive additional record changes from this or another client 104. This change may be for the same or a different record that is at least partially managed by CMS application 140. At the same time or at a subsequent time, the technique 200 may move the record changes to a persistent storage medium, such as the repository 135. For example, in one embodiment, the server 102 may be configured to move the record changes 118 to the repository 135 using transactional save update task functionality. In other words, CMS application 140 may cache (and, when appropriate) intelligently merge various changes in the buffer prior to persisting them, which may speed up the record change (such as saving) process.

In some situations when the technique 200 is employed, the client's ability to perform additional record management functions is not dependent on the time needed to move the record changes 118 from the server 102 to the repository 135. More specifically, the record changes 118 do not need to be immediately moved to the repository 135 (also referred to as being "persisted" in the repository 135). Rather, the record changes can be moved asynchronously to the repository 135 at a future later time. For example, the record changes 118 may be moved to the repository 135 after a predetermined period of time, when traffic on the network 112 gets below the predetermined or dynamically determined threshold, or based on any other suitable scheduling technique.

It will be appreciated, however, that some requests to access the record 116 may be received by the server 102 before the record changes 118 are moved back to the repository 135. As such, in one configuration, when the server 102 receives a request to access one of the records 116, the server 102 is configured to determine whether any record changes 118 associated with the requested record 116 are stored in the buffer 122. In one embodiment, if record changes 118 associated with the requested record 116 are stored in buffer 122, the server 102 may be configured to update the requested record 116 with the changes prior to transmitting the record 116 to the requestor. Alternatively, the server 102 may also be configured to transmit both the non-updated record 116 and the record changes 118 to the requestor (e.g., the client 104), which may be configured to update its copy of the record 116.

In certain implementations, it may take a considerable amount of memory to buffer all of the record changes 118 if the content management system 100 has a large number of users. For this reason, content management system 100 may only communicate a subset of the record changes 118 to the buffer 122 while allowing the remainder of record changes 118 to be communicated directly to the repository 135. For example, the system 100 may be configured to only buffer the record changes 118 associated with one or more predetermined record management functions (e.g., record management functions that are particularly complex and/or time consuming to communicate to the repository 135). Alternatively, the system 100 may be configured to buffer record changes 118 generated by a particular class of users or clients. For example, the system 100 may be configured to buffer record changes (and, thus, decrease response times) for high-volume users or for users who are granted faster access (e.g., managers or users who pay a fee for faster access). It will be appreciated, however, that the above-described classes of authorized types of record changes are merely exemplary. As such, in alternate embodiments, other suitable techniques for classifying and/or authorizing the record changes 118 may be employed.

FIG. 6 is a flow chart illustrating an exemplary technique 300 for decreasing the response time of the content management system for a subset of authorized record changes (as mentioned above) in accordance with one embodiment. In one configuration, software, code, and/or instructions operable to perform the technique 300 are stored on the memory 120 and then executed by the processor 125, as described above with regard to FIG. 2.

As illustrated by steps 202 through 206 of FIG. 6, the technique 300 may begin in the same way as the technique 200 illustrated in FIG. 5. However, unlike the technique 200, after the record changes are received (step 206), the technique 300 may determine whether the record change 118 is authorized to employ the buffer (step 302). For example, as described above, the technique 300 may involve determining whether the record change is associated with an authorized subset of the record management functions or determining if the record change was generated by a client authorized to employ the buffer. If the record change is authorized to employ the buffer, the technique 300 may proceed through steps 208 through 212, as described above with regard to FIG. 5.

If, on the other hand, the record change is not authorized to employ the buffer (step 302), the technique 300 may include communicating the record changes directly to the persistent storage medium (e.g., the repository 135). After the record changes have been persisted in the repository 135, the technique 300 may then update the version number of the record, as indicated by step 210 and cycle back to step 206 to receive additional record changes. It will be appreciated, however, that the server 102 may be configured to perform the technique 300 (as well as the other techniques described herein) simultaneously with different clients 104 or with multiple transactions from one client. For example, the server 102 may simultaneously allow one of the clients 104 to store the record changes 118 in the buffer 122 while denying another one of the clients 104 (or another transaction from the first client 104) access to store changes in the buffer 122.

In another embodiment, illustrated by technique 400 in FIG. 7, access to the buffer 122 may be allocated amongst the clients 104 on a space-available basis. In particular, as illustrated, after completing steps 202-204, the record changes 118 may be communicated to the buffer 122. If there is buffer space available (step 402), the technique 400 will proceed in the same manner as the technique 200 and the received changes will be communicated to the buffer 122 (steps 208-212). However, if the buffer does not have space available, the record changes 118 may be communicated directly to the repository 135 until such time that enough of the record changes 118 are moved from the buffer 122 into the repository 135 to free up available space in the buffer.

In still another embodiment, the content management system 100 may be configured to selectively employ the buffer within the memory 120 based on network traffic in the system 100. For example, FIG. 8 is a flow chart illustrating another exemplary technique 500 for decreasing the response time of a content management system in accordance with one embodiment. In one configuration, software, code, and/or instructions operable to perform the technique 500 are stored on the memory 120 and then executed by the processor 125, as described above with regard to FIG. 2

As with the techniques 300 and 400, the technique 500 may begin by executing steps 202 through 206, as described above with regard to FIG. 5. Next, the technique 500 may involve determining whether the buffer is available, as described above with regard to FIG. 7 and as indicated by step 402. If the buffer is not available, the technique 500 may communicate record changes to the persistent storage medium (e.g., the repository 135) and then update the version number of the record, as indicated by steps 304 and 210. It will be appreciated that step 402, although not required, is advantageous because without available space in the buffer 122, no buffering of the record changes 118 can take place.

If, however, buffer space is available, the technique 500 may next include determining whether network traffic (e.g., traffic of the network 112) is below a threshold level, as indicated by step 502. If network traffic is below the threshold level, (indicating that communicating directly with repository 135 may be tolerable), the technique 500 may include communicating record changes directly to the persistent storage medium and updating the version number of the record, as indicated by steps 304 and 210. If, on the other hand, network traffic is above the threshold level at decisional step 502, the technique 500 may involve executing steps 208 through 212, as described above with regard to FIG. 5. In this way, the buffer may be employed selectively based upon network traffic levels enabling the part of the memory 120 comprising the buffer 122 to be used for other purposes besides buffering the record changes without seriously affecting the performance of the content management system 100.

In yet another embodiment, the buffer 122 may be employed to cache content and/or meta-data from the repository 135. For example, in one embodiment, the buffer 122 may be configured to store copies of one or more of the records 116. In one such embodiment, the buffer 122 may be configured to store both the record changes 118 and copies of one or more of the records 116 themselves. Although storing both the record changes 118 and the records 116 can be memory intensive, it can advantageously decrease the response time for numerous aspects of the content management system 100. In particular, by storing (or partially storing) a copy of the records 116 in the buffer 122, which typically has a much faster response time than the repository 135, accesses (e.g., reads and write) to the record 116 may be faster. For instance, while a record is stored in the buffer 122, the record may be checked-out, manipulated, and/or checked back in without ever having to wait for an access to the repository 135. Moreover, the copies of the records 116 stored in the buffer 122 may be searched both for information and for meta-data without having to search the repository 135.

For example, FIG. 9 is a flow chart illustrating an exemplary technique 600 for decreasing the response time of the content management system 100 in accordance with one embodiment. In one implementation, the technique 600 may be employed by the content management system 100 configured to store one or more of the records 116 in buffer 122. For example, software, code, and/or instructions operable to perform the technique 600 can be stored on the memory 120 and then executed by the processor 125, as described above with regard to FIG. 2

As indicated by step 202 of FIG. 9, the technique 600 may begin in the same manner as the technique 200 discussed above—namely, with the reception of a request to check out one of the records 116. As illustrated by step 602, in one embodiment, after receiving the request to check out one of the records 116, the requested record 116 may be copied to the buffer 122. In alternate embodiments, however, step 602 may be omitted. For example, in one alternate configuration, one or more or the records 116 may be pre-copied over to the buffer 122 prior to the start of the technique 600. As such, if the requested record 116 were one of the pre-copied records, it would be recopied. Similarly, in still other embodiments, other suitable record copying procedures may be employed.

Next, the requested record 116 may be transmitted to the requestor (e.g., one of the clients 104), as indicated by step 204. Any record changes 118 to the record 116 may then be received, as indicated by step 206 and as described above with regard to FIG. 5. After receipt, the record changes 118 may be communicated to the buffer 122, as indicated in step 208. Next, the version number of the record 116 may be updated, as indicated by step 210. In one embodiment, the version number of the record 116 may be updated immediately after the buffer 122 receives the record changes 118. In this embodiment, the record changes 118 may be employed at a subsequent time to update the copy of the record 116 stored in the buffer 122. In another embodiment, however, the copy of the record 116 stored in the buffer 122 is updated based on the record changes 118 prior to the version number of the record 116 being updated (and hence prior to the client 104 being unfrozen). However, due to the relative speed of the buffer 122, this delay is usually acceptable.

In addition, as indicated by step 604 of FIG. 9, the technique 600 may also include periodically synchronizing the original copy of the record 116 stored in the repository 135 with any of the record changes 118 communicated to the buffer 122. In one embodiment, this synchronization is performed by storing and periodically transmitting the record changes 118 to the repository 135. In another embodiment, this synchronization is performed by comparing the copy of the record 116 stored in the buffer 122 with the copy of the record 116 stored in the repository 135 and determining any differences. It will be appreciated, however, that the above-described synchronization techniques are not intended to be exclusive. As such, in other embodiments, other suitable synchronization techniques may be employed. For example, in one other alternate configuration, the server 102 may be configured to work "off-line" from the repository 135 using the technique 600 and to synchronize the record changes 118 with the repository when the server 102 and the repository are reconnected. In this way, the technique 600 may enable the content management system 100 to continue functioning even if the network 112 between the server 102 and the repository 135 is unavailable for a period of time.

The preceding flowcharts and accompanying description illustrate exemplary techniques of improving the performance of a content management system. The system 100 contemplates using or implementing any suitable technique for performing these and other tasks. It will be understood that these techniques are for illustration purposes only and that the described or similar techniques may be performed at any appropriate time, including concurrently, individually, or in combination. In addition, many of the steps in these flowcharts may take place simultaneously and/or in different orders than as shown. Moreover, the system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure.

What is claimed is:

1. An article comprising computer-readable instructions stored on tangible media, the instructions operable when executed by a processor to cause one or more computers to:
   receive a request to perform a record management function on a record stored on a persistent storage medium in a content management system;
   transmit the record to a client from the persistent storage medium;

identify that the record management function is authorized to employ the buffer based on at least one of a type of the record management function and a class of the client; and communicate changes to the record associated with the record management function to a buffer communicably coupled to the persistent storage medium upon identification that the record management function is authorized; and move the buffered changes to the persistent storage medium such that the record is updated.

2. The article of claim 1, wherein moving the buffered changes comprises asynchronously copying the changes to the persistent storage medium when traffic in the content management system is below a threshold value.

3. The article of claim 1, wherein moving the buffered changes comprises asynchronously copying the changes to the persistent storage medium after a predetermined number of changes have been saved in the buffer.

4. The article of claim 1, the instructions further operable when executed by the processor to cause the one or more computers to:

receive a request from the client to access the record;
determine that one or more buffered changes associated with the record have not been moved to the persistent storage medium; and
transmit the one or more buffered changes from the buffer to the client.

5. The article of claim 1, wherein receiving the request to perform the record management function on the record comprises receiving a request to perform an action on an electronic document.

6. The article of claim 1, wherein receiving the request to perform the record management function on the record comprises receiving a request to move the content of the record into the buffer.

7. The article of claim 6, the instructions further operable when executed by the processor to cause the one or more computers to synchronize the copy of the record changes in the buffer with the persistent storage medium.

8. The article of claim 1, the instructions further operable when executed by the processor to cause the one or more computers to:

receive a second request to perform a second record management function on the record;
identify that the second requested record management function is not authorized to employ the buffer; and
based on the identification, communicate the changes associated with the second record management function directly to the persistent storage medium.

9. The article of claim 8, wherein the second record management function is performed while the authorized record management function is communicating with the buffer.

10. The article of claim 1, the instructions further operable when executed by the processor to cause the one or more computers to disable saving changes associated with the record management function in the buffer for a particular record.

11. The article of claim 1, wherein the persistent storage medium is a repository coupled to a network.

12. A content management system comprising:
a persistent storage medium configured to store one or more records; and
one or more processors executing a buffer coupled to the persistent storage medium, wherein the content management system is configured to:

receive a request to perform a record management function on a record stored on the persistent storage medium;
transmit the record to a client from the persistent storage medium;
identify that the record management function is authorized to employ the buffer based on at least one of a type of the record management function and a class of the client;
save changes to the record associated with the record management function in the buffer upon identification that the record management function is authorized to employ the buffer; and
asynchronously move the saved changes from the buffer to the persistent storage medium.

13. The content management system of claim 12, wherein the content management system is configured to asynchronously copy the changes to the persistent storage medium when traffic in the content management system is below a threshold value.

14. The content management system of claim 12, wherein the content management system is configured to asynchronously copy the changes to the persistent storage medium after a predetermined number of changes have been saved in the buffer.

15. The content management system of claim 12, wherein the content management system is further configured to:
receive a request from the client to access the record;
determine that one or more saved changes associated with the record have not been copied to the persistent storage medium; and
transmit the one or more saved changes to the client.

16. The content management system of claim 12, wherein the content management system is configured to only save changes associated with a subset of record management functions to the buffer.

17. A content management system comprising:
means for receiving a request to perform a record management function on a record stored on a persistent storage medium in a content management system;
means for transmitting the record to a client from the persistent storage medium;
means for determining that the record management function is authorized to employ the buffer based on at least one of a type of the record management function and a class of the client;
means for communicating changes to the record associated with the record management function to a buffer communicably coupled to the persistent storage medium upon determining that the record management function is authorized; and
means for moving the buffered changes to the persistent storage medium such that the record is updated.

18. The content management system of claim 17, comprising:
means for receiving a request from the client to access the record;
means for determining that one or more saved changes associated with the record have not been copied to the persistent storage medium; and
means for transmitting the one or more saved changes to the client.

19. The content management system of claim 17, wherein the means for communicating changes comprises means for communicating a subset of authorized changes to the buffer.

20. The article of claim 1, wherein identifying that the record management function is authorized to employ the buffer based on at least one of a type of the record management function and a class of the client comprises at least one of:

determining that a complexity of the record management function exceeds a threshold;

determining that a time duration to communicate the changes associated with the record management function from the client to the buffer exceeds a threshold; and determining that the class of the client comprises at least one of a high-volume client class and a fee-based access class.

21. The content management system of claim 17, further comprising at least one of:

means for determining that a complexity of the record management function exceeds a threshold;

means for determining that a time duration to communicate the changes associated with the record management function from the client to the buffer exceeds a threshold; and means for determining that the class of the client comprises at least one of a high-volume client class and a fee-based access class.

\* \* \* \* \*